United States Patent Office 3,288,744
Patented Nov. 29, 1966

3,288,744
VINYL HALIDE RESINS STABILIZED WITH TRIS-
(HYDROXYMETHYL) AMINOMETHANE
Fred F. Holub, Scotia, and Moyer M. Safford, Schenectady, N.Y., assignors to General Electric Company, a corporation of New York
No Drawing. Filed Jan. 29, 1964, Ser. No. 341,100
7 Claims. (Cl. 260—30.6)

The present invention relates to stabilizations of vinyl resins. More particularly, the invention is concerned with the stabilization of halogenated vinyl resins against the action of heat by incorporating therein stabilizing amounts of tris (hydroxymethyl) aminomethane (hereinafter referred to as the "aminomethane") having the formula

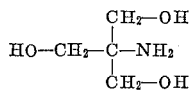

This compound has been found to have unusual heat stabilizing properties even at temperatures as high as 170° C. for times as long as 120 minutes.

Broadly, our invention relates to the heat stabilization of halogen-containing resinous compositions produced by halogenating vinyl resins or by polymerizing compositions comprising a vinyl (including vinylidene) halide with or without other copolymerizable compounds. Among such compositions are (1) halogenated, e.g., chlorinated polyethylene, the polyvinyl halides, such as, for example, polyvinyl chloride, polyvinyl bromide, polyvinylidene chloride, polyvinylidene fluoride, neoprene, polyvinyl fluoride, etc.; (2) vinyl resins produced by the conjoint polymerization of a vinyl halide, e.g., vinyl chloride, and a vinyl ester of a lower saturated aliphatic monocarboxylic acid, e.g., vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., it being obvious from the foregoing examples that the term "lower saturated aliphatic monocarboxylic acid" embraces ones containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of vinyl halide, e.g., vinyl chloride, and a vinylidene halide, e.g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be stabilized with this aminomethane may be found in e.g., D'Alelio Patents 2,378,753, issued June 19, 1945, and 2,299,740, issued October 27, 1942, both of which are assigned to the same assignee as the present invention.

The fact that the particular aminomethane was so highly effective as a stabilizer was entirely unexpected and in no way could have been predicted because other alkanolamines, for instance, monoethanolamine or diethanolamine, when substituted under otherwise equivalent conditions in place of the tris(hydroxymethyl) aminomethane, using both tricresyl phosphate and di(2-ethylhexyl) phthalate as plasticizers in a polyvinyl chloride resin, caused the resin to darken quite rapidly at the end of two hours at 150° C., whereas even after two hours at 170° C., the plasticized resin stabilized with the aminomethane, showed little if any evidence of decomposition. Additionally, it was desirable to find that this aminomethane could effect stabilization of halogenated vinyl resins for the reason that the usual stabilizers are based on lead compounds, for example, $Pb_2O_3$, PbO, $Pb_3O_4$, tribasic lead silicate, lead carbonate, etc. The presence of these lead salts poses a toxicity problems because of the danger of lead poisoning. The aminomethane employed for stabilization purposes in our invention obviates this threat.

The halogenated vinyl resins may have incorporated therein various plasticizers such as tricresyl phosphate, dibutyl phthalate, di-(2-ethylhexyl) phthalate, dibutyl sebacate, di-(2-ethylhexyl) sebacate, di - (2 - ethylhexyl) azelate, epoxidized soy-bean oil, etc. The amount of plasticizer which may be used may be varied from about ½ to 2 parts, by weight, of the plasticizer to one part of the vinyl halide resin. Stated alternately, the amount of plasticizer employed may vary from about 20 percent to 66⅔ percent, by weight, based on the total weight of the halogenated vinyl resin and the plasticizer.

Various fillers may also be added in amounts ranging from about 10 to 200 percent or more, by weight, based on the total weight of the filler and the halogenated vinyl resin. Among such fillers may be mentioned carbon black, barytes, zinc oxide, clay, wood flour, and other pigments and fillers commonly used in the rubber and plastics industries.

In order that those skilled in the art may better understand how the present invention may be practiced, the following examples are given by way of illustration and not by way of limitation. All parts are by weight.

The tris (hydroxymethyl) aminomethane (which is available from Commercial Solvents Corporation and is more particularly described in U.S. Patent 2,485,982) may be prepared by reducing the corresponding tris(hydroxymethyl) nitromethane as described in an article by Hass et al., entitled, "The Nitroparaffins," Chemical Reviews, 32, page 373 (1943).

*Example 1*

Several formulations were compounded on milling rolls at 125° C. from polyvinyl chloride, a plasticizer of either tricresyl phosphate or di(2-ethylhexyl) phthalate and the tris(hydroxymethyl) aminomethane. These formulations are identified in the following Table I where all amounts shown are in parts by weight:

TABLE I

|  | Sample Number ||||
|---|---|---|---|---|
|  | 1 | 2 | 3 | 4 |
| Polyvinyl chloride | 55 | 55 | 55 | 55 |
| Tricresyl phosphate |  | 40 | 40 |  |
| Di-(2-ethylhexyl) phthalate | 40 |  |  | 40 |
| Tris(hydroxymethyl) aminomethane | 5 | 5 |  |  |

Each of the samples was pressed into flat sheets and thereafter heated at 150° C. for periods varying up to 4 hours. As a result of these tests it was found that Sample No. 1 was essentially unchanged and almost waterwhite in color (the same as the original starting sample) after 4 hours. Sample No. 2 was essentially unchanged after 60 minutes at 150° C. and after 4 hours there was only slight evidence of yellowing of the sample. In contrast to this, the unstabilized Sample No. 3 employing tricresyl phosphate as plasticizer, after 60 minutes was already quite dark brown in color and after 4 hours was almost black. The unstabilized Sample No. 4 employing di(2-ethylhexyl) phthalate as the plasticizer had turned a light brown after 120 minutes and after 4 hours was dark brown in color.

Example 2

When the same formulations were prepared as in Example 1 and thereafter the samples were tested for 90 minutes at 170° C. and then for 120 minutes at 170° C., it was found that the stabilized Sample No. 1 employing di(2-ethylhexyl) phthalate as plasticizer was essentially unchanged in color from the original sample prior to the heat-aging. After 90 minutes at 170° C., the stabilized Sample No. 2 containing tricresyl phosphate plasticizer had turned slightly yellow but was still quite light in color. After 120 minutes at 170° C., the stabilized sample using tricresyl phosphate as plasticizer had begun to show small flecks of red in a yellow background, but this still indicated satisfactory stabilization action of the aminomethane compound in view of the high temperature at which the heat aging was carried out, and further in view of the fact that polyvinyl chloride resins plasticized with tricresyl phosphate are historically difficult to stabilize at the very high temperatures at which the tests were conducted. In contrast to the above, samples from which the stabilizers were omitted, were quite dark and black in color after less than 60 minutes at 170° C. regardless of the plasticizer used.

The following example illustrates the unexpectedly poorer heat-stabilizations using in place of the above aminomethane, other types of alkanolamines.

Example 3

Formulations were prepared from polyvinyl chloride, a plasticizer of either di(2-ethylhexyl) phthalate or tricresyl phosphate, employing various alkanolamines as heat stabilizers. Each of the compositions was prepared by milling the ingredients on a mill at 125° C., passing the samples into a sheet and thereafter heat-aging the sheets for 4 hours at 150° C. The following Table II shows the formulations used in each instance, as well as the color of the heat-aged samples after the above heat-aging cycle.

TABLE II

| | | | | | | | |
|---|---|---|---|---|---|---|---|
| Polyvinyl chloride | 58 | 58 | 58 | 58 | 58 | 58 | Dark. |
| Tricresyl phosphate | 40 | 40 | 40 | | | | Dark. |
| Di(2-ethylhexyl) phthalate | | | | 40 | 40 | 40 | Dark. |
| 1-Amino-2-propanol | 2 | | | 2 | | | Black. |
| 2-Amino-2-methyl-propanol | | 2 | | | 2 | | Black. |
| 2-Amino-2-ethyl-1,3-propanediol | | | 2 | | | 2 | Black. |

From the foregoing examples, it will be apparent that halogenated vinyl resins employing the aminomethane stabilizer disclosed above are able to maintain their light color irrespective of the fact that they were heated at temperatures which caused the unstabilized materials to darken and decompose. Moreover, the fact that the decomposition of the vinyl chloride resin could be substantially prevented means that the physical properties can be maintained over a wide temperature range.

Although in the above examples, about 10%, by weight, stabilizer based on the weight of the halogenated vinyl resin has been employed, we do not intend to be limited to such ranges. Thus, stabilizing effects can be found when the stabilizer is used in an amount as low as 0.5% to as high as 25%, by weight, based on the weight of the halogenated vinyl resin. Although amounts in excess of 25% may be employed, for economical reasons we prefer not to use larger amounts. Advantageously, we employ from about 1 to 12%, by weight, of the stabilizer based on the weight of the halogenated vinyl resin.

It will be apparent to those skilled in the art that in place of the plasticizers employed above and the halogenated vinyl halide resin employed in the above examples other vinyl resins and other plasticizers many examples of which have been given above, may be employed without departing from the scope of the invention. The proportions of ingredients including the plasticizer and any other fillers or compositions incorporated in the vinyl resin may be varied widely within the scope of our intended invention.

Various means well known to the art may be used for incorporating the stabilizer of this invention into the resinous compositions, among these being the one disclosed in the foregoing examples wherein sheeting on differential rolls (or mill rolls) was employed.

The stabilized halogenated vinyl polymers of this invention may be used not only for compression, extrusion and injection molding compounds, but also for the preparation of insulated electrical cables either by taping, extrusion or other methods used in the art. They also may be employed in the production of varnishes, adhesives, castings, laminated products, etc.

It is to be understood that copolymers of a vinyl-halide with other polymerizable materials, for example, vinyl acetate, may also be stabilized in accordance with our invention. For example, compositions comprising the product of conjoint polymerization of a mixture comprising vinyl chloride and a polymerizable vinyl ester, for instance, vinyl acetate, may be stabilized with this amino-methane. More particularly, we may use, for example, copolymers in which the vinyl halide comprises by weight, about 75 to 85 percent of the total weight of the polymerizable materials. However, we may use other copolymers in which the vinyl halide is present in lower concentrations, for example, from 40 to 70 percent by weight, or higher concentrations, for instance, as high as 98 percent by weight. For maximum strength and flame-resisting properties, we prefer that the vinyl halide used in preparing the copolymer be present in the copolymer in an amount equal to, by weight, at least 60 percent, preferably 80 percent of the total weight of the co-polymerizable ingredients.

What we claim as new and desire to secure by Letters Patent of the United States is:

1. A composition of matter comprising a major portion of a mixture of (1) a halogenated vinyl resin and (2) a stabilizing amount up to 12%, by weight, based on the weight of (1), of a heat stabilizer therefor comprising tris(hydroxymethyl) aminomethane.

2. A composition of matter comprising a major portion of a mixture of (1) a vinyl halide resin, (2) a plasticizer for the vinyl halide resin and (3) from 0.5 to 12%, by weight, based on the weight of the vinyl halide resin, of a heat stabilizer comprising tris(hydroxymethyl) aminomethane.

3. A composition of matter comprising a polymeric mass including a major portion of a mixture of (1) polyvinyl chloride, (2) a plasticizer for (1), and (3) up to 12%, by weight, based on the weight of (1), of a heat stabilizer for (1) comprising tris(hydroxymethyl) aminomethane.

4. A composition comprising a major portion of a mixture of (1) the product of conjoint polymerization of a mixture containing a vinyl halide and a polymerizable vinyl ester of a lower saturated aliphatic monocarboxylic acid containing at most 6 carbon atoms, (2) a plasticizer for (1) and (3) from 0.5 to 12%, by weight, based on the weight of (1) of tris(hydroxymethyl) aminomethane.

5. A composition as in claim 4 wherein the vinyl ester is vinyl acetate.

6. A composition as in claim 1 wherein the plasticizer is tricresyl phosphate.

7. A composition as in claim 1 wherein the plasticizer is di(2-ethylhexyl) phthalate.

References Cited by the Examiner

UNITED STATES PATENTS 2,686,732  8/1954  Montgomery et al. _____ 117—4
2,888,422  5/1959  Johnson et al. _____ 260—45.9

MORRIS LIEBMAN, *Primary Examiner.*

L. T. JACOBS, *Assistant Examiner.*